United States Patent
Zhu et al.

(10) Patent No.: US 12,053,875 B2
(45) Date of Patent: Aug. 6, 2024

(54) METHOD AND SYSTEM FOR DETERMINING SENSOR PLACEMENT FOR A WORKSPACE BASED ON ROBOT POSE SCENARIOS

(71) Applicant: Ford Global Technologies, LLC, Dearborn, MI (US)

(72) Inventors: Ling Zhu, Canton, MI (US); Meghna Menon, Rochester Hills, MI (US); Mario Anthony Santillo, Canton, MI (US); Gregory P. Linkowski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 17/143,634

(22) Filed: Jan. 7, 2021

(65) Prior Publication Data
US 2022/0212349 A1 Jul. 7, 2022

(51) Int. Cl.
*B25J 13/08* (2006.01)
*B25J 9/16* (2006.01)
*B25J 19/04* (2006.01)

(52) U.S. Cl.
CPC ........... *B25J 13/089* (2013.01); *B25J 9/1666* (2013.01); *B25J 9/1697* (2013.01); *B25J 19/04* (2013.01)

(58) Field of Classification Search
CPC ...... B25J 13/089; B25J 9/1666; B25J 9/1697; B25J 19/04; B25J 9/1661; B25J 13/087; G05B 2219/31343; G05B 19/41885
See application file for complete search history.

(56) References Cited

U.S. PATENT DOCUMENTS

| | | | |
|---|---|---|---|
| 9,536,019 B2 * | 1/2017 | Sandberg | H04N 7/181 |
| 10,091,418 B2 | 10/2018 | Alvarado-Moya et al. | |
| 2008/0133190 A1 * | 6/2008 | Peretz | G08B 13/00 |
| | | | 703/6 |

(Continued)

FOREIGN PATENT DOCUMENTS

| | | |
|---|---|---|
| CN | 110842914 | 2/2020 |
| DE | 102008046348 | 3/2010 |

OTHER PUBLICATIONS

Chen et al, Camera Placement Considering Occlusion for Robust Motion Capture, Stanford Computer Science Technical Report CS-TR-2000-07, Computer Graphic Laboratory, Stanford University, pp. 1-8.

(Continued)

*Primary Examiner* — Jason Holloway
*Assistant Examiner* — Madison B Emmett
(74) *Attorney, Agent, or Firm* — Burris Law, PLLC (57) ABSTRACT

A method includes generating a workspace model having one or more robots and a plurality of image sensors, defining a plurality of pose scenarios of the one or more robots, and defining sensor characteristics of the plurality of image sensors. The method includes, for each of the plurality of pose scenarios, simulating a sensor operation of the plurality of image sensors within the workspace model based on the sensor characteristics and identifying an undetectable area within the workspace model based on the simulated sensor operation. The method includes performing a sensor placement control based on the undetectable areas associated with each of the plurality of pose scenarios.

20 Claims, 4 Drawing Sheets

(56) References Cited

U.S. PATENT DOCUMENTS

| | | | | |
|---|---|---|---|---|
| 2010/0321492 A1* | 12/2010 | Cornett | ............ | G08B 13/19641 |
| | | | | 348/143 |
| 2012/0039526 A1* | 2/2012 | Garaas | ............. | G08B 13/19641 |
| | | | | 382/154 |
| 2017/0076015 A1* | 3/2017 | Patel | ........................ | G06F 30/18 |
| 2019/0364224 A1* | 11/2019 | Nishibe | ................ | H04N 13/271 |
| 2020/0073358 A1* | 3/2020 | Dedkov | ..................... | G06T 7/75 |
| 2022/0262069 A1* | 8/2022 | Singh | ...................... | G06T 17/10 |

OTHER PUBLICATIONS

Garg et al, Camera and Light Source Placement: A Multi-Objective Approach, Third National Conference on Computer Vision, Pattern Recognition, Image Processing and Graphics, IEEE Xplore, Dec. 2011.

* cited by examiner

METHOD AND SYSTEM FOR DETERMINING SENSOR PLACEMENT FOR A WORKSPACE BASED ON ROBOT POSE SCENARIOS

FIELD

The present disclosure relates to a method and/or system for positioning one or more sensors within a workspace.

BACKGROUND

The statements in this section merely provide background information related to the present disclosure and may not constitute prior art.

A workspace can include one or more industrial robots that perform various automated tasks. Furthermore, the workspace may include one or more sensors configured to obtain image data of the workspace, thereby enabling a computing device and/or a robot controller to identify objects in the workspace. By identifying objects in the workspace, the industrial robot can accommodate the objects within the workspace while performing various automated tasks. However, undetectable zones within the workspace due to, for example, the limitations of the one or more sensors, placement of robots, and/or workspace configuration, among other factors, may prevent the industrial robot from accommodating the objects within the undetectable zones of the workspace.

These issues with the use of industrial robots in a manufacturing environment, among other issues with industrial robots, are addressed by the present disclosure.

SUMMARY

This section provides a general summary of the disclosure and is not a comprehensive disclosure of its full scope or all of its features.

The present disclosure provides a method including generating a workspace model having one or more robots and a plurality of image sensors, where the workspace model is a digital model of a workspace. The method includes defining a plurality of pose scenarios of the one or more robots, where each pose scenario of the plurality of pose scenarios includes a pose of each of the one or more robots. The method includes defining sensor characteristics of the plurality of image sensors, where the sensor characteristics includes an orientation of the image sensors, a location of the sensor within the workspace model, or a combination thereof. The method includes for each of the plurality of pose scenarios: simulating a sensor operation of the plurality of image sensors within the workspace model based on the sensor characteristics and identifying an undetectable area within the workspace model based on the simulated sensor operation. The method includes performing a sensor placement control based on the undetectable areas associated with each of the plurality of pose scenarios.

In some forms, the method further includes determining an aggregate undetectable area based on the undetectable areas associated with each of the plurality of pose scenarios.

In some forms, the sensor placement control further comprises modifying a sensor configuration within the workspace model in response to the aggregate undetectable area not satisfying a detection metric.

In some forms, the method further includes determining whether the aggregate undetectable area corresponds to a Pareto optimal state.

In some forms, the sensor placement control further includes modifying a sensor configuration within the workspace model such that the undetectable area corresponds to the Pareto optimal state.

In some forms, the undetectable area within the workspace model is identified based on a plurality of voxels representing the workspace model.

In some forms, the method further includes generating a depth map based on the simulated sensor operation and the plurality of voxels, where the undetectable area within the workspace model is determined based on one or more values of the depth map.

In some forms, each of the one or more values of the depth map is associated with one of the plurality of voxels.

In some forms, the undetectable area within the workspace model is determined in response to the one or more values of the depth map being less than a threshold depth value.

In some forms, the method further includes reducing a resolution of the depth map.

In some forms, the plurality of pose scenarios include a default pose state and a dynamic pose state.

In some forms, the default pose state corresponds to the pose of each of the one or more robots having a default value.

In some forms, the dynamic pose state corresponds to the pose of at least one of the one or more robots not having a default value.

The present disclosure provides a system including a processor and a nontransitory computer-readable medium including instructions that are executable by the processor. The instructions include generating a workspace model having a one or more robots and a plurality of image sensors, where the workspace model is a digital model of a workspace. The instructions include defining a plurality of pose scenarios of the one or more robots, where each pose scenario of the plurality of pose scenarios includes a pose of each of the one or more robots. The instructions include defining sensor characteristics of the plurality of image sensors, where the sensor characteristics includes an orientation of the image sensors, a location of the sensor within the workspace model, or a combination thereof. The instructions include, for each of the plurality of pose scenarios: simulating a sensor operation of the plurality of image sensors within the workspace model based on the sensor characteristics and identifying an undetectable area within the workspace model based on the simulated sensor operation. The instructions include performing a sensor placement control based on the undetectable areas associated with each of the plurality of pose scenarios.

In some forms, the instructions further include determining an aggregate undetectable area based on the undetectable areas associated with each of the plurality of pose scenarios.

In some forms, the sensor placement control further includes modifying a sensor configuration within the workspace model in response to the aggregate undetectable area not satisfying a detection metric.

In some forms, the instructions further include determining whether the aggregate undetectable area corresponds to a Pareto optimal state.

In some forms, the sensor placement control further includes modifying a sensor configuration within the workspace model such that the undetectable area corresponds to the Pareto optimal state.

In some forms, the undetectable area within the workspace model is identified based on a plurality of voxels representing the workspace model.

The present disclosure provides a method including generating a workspace model having a one or more robots and a plurality of image sensors, where the workspace model is a digital model of a workspace. The method includes defining a plurality of pose scenarios of the one or more robots, where each pose scenario of the plurality of pose scenarios includes a pose of each of the one or more robots. The method includes defining sensor characteristics of the plurality of image sensors, where the sensor characteristics includes an orientation of the image sensors, a location of the sensor within the workspace model, or a combination thereof. The method includes, for each of the plurality of pose scenarios: simulating a sensor operation of the plurality of image sensors within the workspace model based on the sensor characteristics and identifying an undetectable area within the workspace model based on the simulated sensor operation and a plurality of voxels representing the workspace model. The method includes determining an aggregate undetectable area based on the undetectable areas associated with each of the plurality of pose scenarios and performing a sensor placement control based on the aggregate undetectable area associated with each of the plurality of pose scenarios.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides for a sensor placement computing system that optimizes sensor coverage of a workspace. The sensor placement computing system may generate a digital model of a workspace and define pose scenarios of one or more robots and sensor characteristics of image sensors. For each of the pose scenarios, the sensor placement computing system may simulate the sensor operation and identify undetectable zones within the workspace. Subsequently, the sensor placement computing system may optimize the sensor layout of the workspace based on the undetectable areas associated with each of the pose scenarios, which may include adjusting a number of sensors, a placement of the sensors, a pose of the sensors, or a combination thereof. Accordingly, optimizing the sensor layout enables the workspace to reduce undetectable areas, reduce a number of sensors, or a combination thereof.

Figure 1:
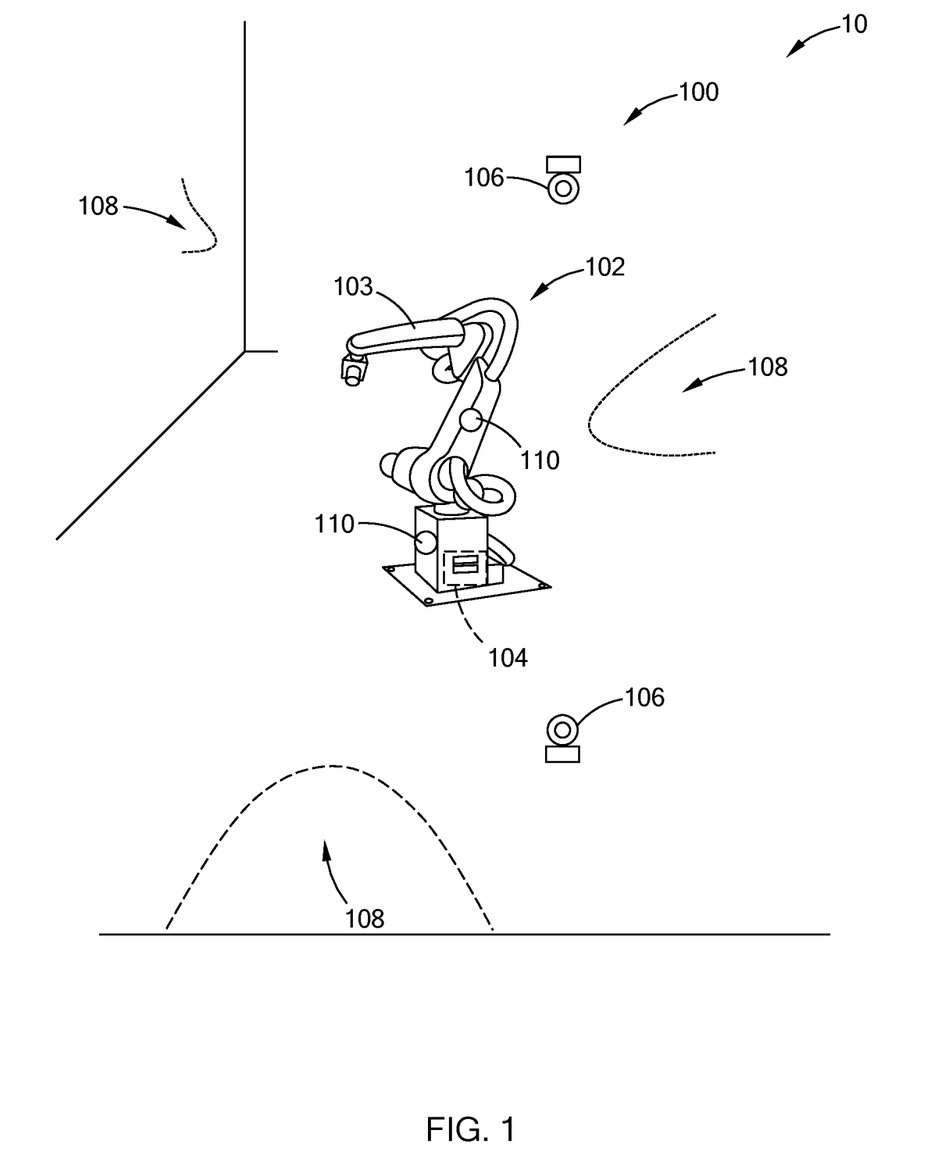
FIG. 1 illustrates a workspace in accordance with the teachings of the present disclosure.

Referring to FIG. 1, a system 10 includes a workspace, generally referenced by reference number 100, in a manufacturing facility and a robot 102 within the workspace 100. The workspace 100 may be an uncaged area having no fence or other containment-like structure for confining the movement of the robot 102 or a caged area having a fence or other containment-like structure for confining the movement of the robot 102. The workspace 100 may also be a mobile platform configured to move to various parts of the manufacturing facility.

In one form, the robot 102 includes a robotic arm 103 with varying range of motion and a robot controller 104 configured to operate the robotic arm 103 to perform one or more automated tasks. As an example, the robot controller 104 may control the robotic arm 103 to pick-up and move a workpiece (not shown) from a staging area to a processing area. While the robot 102 is illustrated as a stationary robotic arm, the robot may be any other suitable robot and should not be limited to the robot illustrated in the figure. For example, the robot 102 may be a mobile robot. While FIG. 1 illustrates one robot 102, it should be understood that any number of robots 102 may be provided within the workspace 100 in other forms, and that the robots may be different from one another.

To monitor the robot 102, the workspace 100 includes image sensor(s) 106 positioned at various locations within the workspace 100. In some forms, the image sensor(s) 106 are configured to obtain image data of the workspace 100. As an example, the image sensor(s) 106 include, but are not limited to: a two-dimensional camera, a three-dimensional camera, an infrared sensor, a radar scanner, a laser scanner, a light detection and ranging (LIDAR) sensor, and/or an ultrasonic sensor. As described below in further detail, a computing system in communication with the robot 102 and the image sensor(s) 106 uses the data from the image sensor(s) 106 to form a digital model of the workspace 100, identify undetectable areas, such as dashed areas 108 within the workspace 100, and/or optimize a sensor configuration of the workspace 100.

In one form, the robot 102 includes one or more robotic sensors 110 (i.e., "robot sensors" 110 herein) to generate data corresponding to various operating metrics of the robot 102. As an example, the robotic sensors 110 may include a location sensor (e.g., a near-field communication (NFC) sensor, an ultrawide-band (UWB) sensor) configured to generate location information of the robot 102. As another example, the robotic sensors 110 may include an accelerometer, a gyroscope, and/or a magnetometer configured to generate orientation information of the robot 102. As yet another example, the robotic sensors 110 may include a velocity sensor configured to generate velocity information of the robot 102, a power sensor to generate power information (e.g., information regarding amount of current and/or voltage being applied by a power source to the robot 102), a torque sensor configured to generate torque information of various joints of the robot 102, and/or a touch sensor at a handle of the robot 102 configured to detect contact. The robotic sensors 110 are configured to provide the information to the robot controller 104 for further processing and for controlling the robotic arm 103. While specific examples are provided herein, the robot 102 may include other sensors and should not be limited to the sensors described herein.

Figure 2:
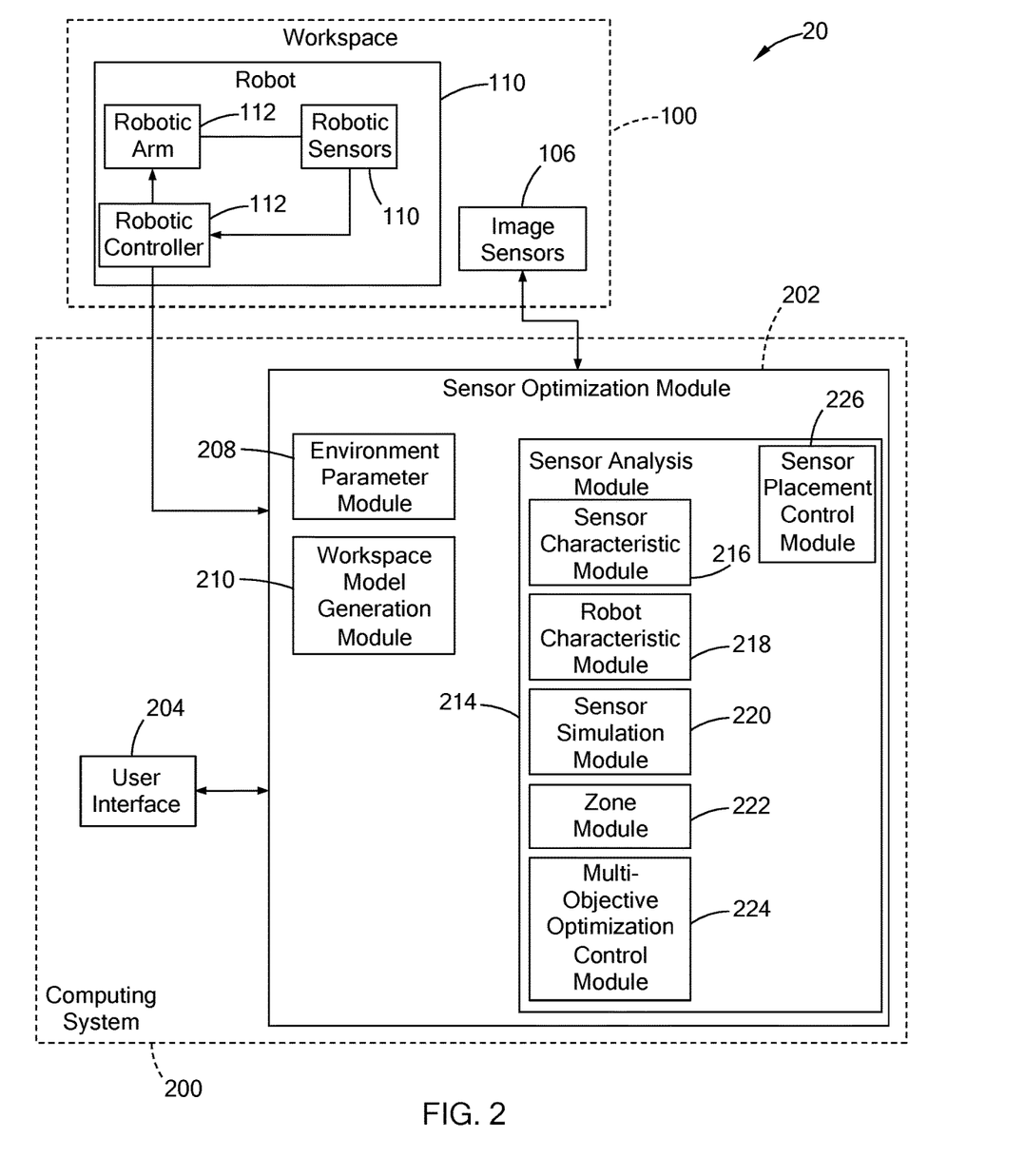
FIG. 2 is a functional block diagram of an exemplary sensor coverage detection system in accordance with the teachings of the present disclosure.

Referring to FIG. 2, a block diagram 20 illustrating a computing system 200 communicatively coupled to a robotic controller 112 and the image sensor(s) 106 is shown. In one form, the computing system 200 is communicatively coupled to the robotic controller 112 and the image sensor(s) 106 by way of an area network, a dedicated communication link, or a combination thereof. Accordingly, the computing system 200, the image sensor(s) 106, and the robotic controller 112 each include hardware components to establish the communication link in accordance with a communication protocol, such as a wired communication protocol and/or wireless communication protocol (e.g., Bluetooth protocol, Zigbee protocol, Wi-Fi protocol, UWB protocol, NFC protocol, and cellular protocols, among others). In some forms, the hardware components of the computing system 200 and the robotic controller 112 include, but are not limited to, transceivers, routers, input/output ports, and software executable by one or more processors.

The robotic controller 112 includes computer-readable software programs that are executed by one or more processors of the robotic controller 112. As an example, the robotic controller 112 includes computer-software programs that include programs, when executed by the robotic controller 112, has the robot 102 perform predefined automated tasks in which the robot 102 performs one or more motions to achieve a desired result. In some forms, the robotic controller 112 includes computer-software programs that, when executed by the robotic controller 122, obtains the sensor and processes the sensor data from the robotic sensors 110 to monitor operations of the robotic arm 103.

In one form, the computing system 200 includes a sensor optimization module 202 and a user interface 204. The sensor optimization module 202 includes computer-readable software programs that are executable by the one or more processors of the computing system 200. Accordingly, the computing system 200 may include a microprocessor(s), a memory for storing code executed by the microprocessor(s), and other suitable hardware components to provide the described functionality of the computing system 200. In some forms, the sensor optimization module 202 includes an environment parameter module 208, a workspace model generation module 210, and a sensor analysis module 214.

The environment parameter module 208 is configured to identify various operating parameters of the workspace 100. In one form, the operating parameters of the workspace 100 include, but are not limited to: a 2D/3D operating range of the robot 102, a size of the robot 102, a type of robot 102 (e.g., a cartesian robot, a cylindrical robot, a spherical robot, a parallel robot, an articulated robot, among others), a degree of freedom of the robot 102, and/or the dimensions of a mobile platform in which the workspace 100 is provided. The operating parameters of the workspace 100 may be obtained from the robotic controller 112 and/or inputted by a user using the user interface 204, which may include at least one of a touchscreen display, a microphone, buttons, barcode scanners t, among other interfaces exchanging data/information with the computing system 200.

The workspace model generation module 210 is configured to generate a digital model of the workspace 100 based on a virtual representation of the workspace 100. As an example and referring to FIG. 3, the workspace model generation module 210 is configured to generate a voxelization representation of the workspace 100 having three of the robots 102 as the digital model. The voxelization representation is provided herein as voxelization 100' and includes voxels 101'. In some forms, the voxelization 100' may define boundaries of the workspace 100 and include digital representations of various fixed objects of the workspace 100, such as a digital representation of the robot 102 (hereinafter referred to as robot 102') and/or a digital representation of the image sensor(s) 106 (hereinafter referred to as image sensor(s) 106'). It should be understood that the workspace model generation module 210 may generate other discrete grid models as the digital model and is not limited to the voxelization 100' described herein.

Figure 3:
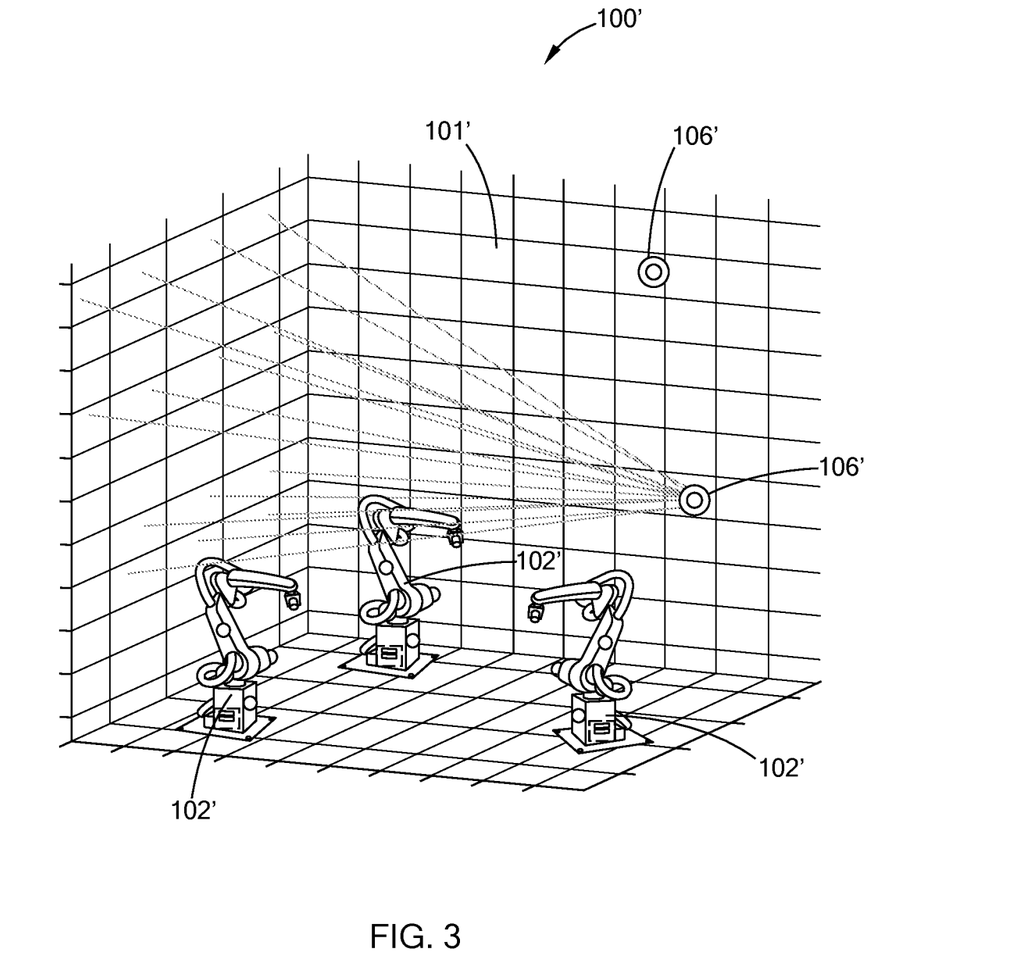
FIG. 3 is digital model of a workspace in accordance with the teachings of the present disclosure.

In some forms, the virtual representation may be predetermined and stored in the computing system 200 (e.g., stored in a database of the computing system 200). Furthermore, if new features are added to the workspace 100, the virtual representation may also be updated and stored in the computing system 200. In one form, the virtual representation is a computer aided design (CAD) drawing/modeling of the workspace 100, the robots 102, and the image sensors 106 within the workspace 100. As another example, the virtual representation is a model where modeled components can be moved (e.g., a modeled component indicative of the robot 102 being configured according to joint angles measured by the built-in encoders).

In some forms, the workspace model generation module 210 is configured to generate the voxelization 100' based on the operating parameters, the virtual representation, and/or the sensor data from the image sensor(s) 106. That is, when the image sensor(s) 106 include one or more 2D/3D cameras, the workspace model generation module 210 performs a spatial transformation of the data from the one or more 2D/3D cameras. Using the virtual representation, the workspace model generation module 210 performs a mapping function that defines a spatial correspondence between all points in an image from the one or more 2D/3D cameras with the virtual representation. Example spatial transformation techniques for digital image processing include, but are not limited to, a checkerboard, QR-Code style artifact, among others, and the spatial transformation techniques can be used to calibrate extrinsic characteristics, (e.g., the pose of the image sensor(s) 106). With the extrinsic characteristics, various known algorithms can be used to position the recorded data in the real world (i.e., to convert from the camera frame to the world frame).

In some forms, the workspace model generation module 210 is configured to identify and classify objects provided in the voxelization 100'. As an example, the workspace model generation module 210 identifies and classifies the objects of the voxelization 100' based on an object classification library, which associates a plurality of objects with one or more classifications. The classifications may include, but are not limited to: the robot 102, the image sensor(s) 106, the robotic sensors 110, a human, a moveable object (e.g., a workpiece, a power tool, fasteners, among others), and/or a static object (e.g., workbench, table, human machine interface, among others).

In some forms, the sensor analysis module 214 includes a sensor characteristic module 216, a robot characteristic module 218, a sensor simulation module 220, a zone module 222, a multi-objective optimization control (MOC) module 224, and a sensor placement control module 226. The sensor characteristic module 216 is configured to define sensor characteristics of the image sensor(s) 106', such as, but are not limited to: a sensor type, an orientation, a field of view, and/or a location. In one form, the sensor characteristics may be inputted by a user of the computing system 200 via the user interface 204. In another form, the sensor characteristics may be predetermined and selected from a repository (e.g., a database). In yet another form, the sensor characteristics may be obtained from the image sensor(s) 106 of the workspace 100.

The robot characteristic module 218 is configured to define robot characteristics of the robot 102' (or the robot 102). In one form, the robot characteristics include, but are not limited to: spatial-related parameters and/or the operating parameters. Example spatial-related parameters include a location of the robot 102', pose scenarios of the robot 102', such as a default pose state or a dynamic pose state. In some forms, the default pose state corresponds to the pose of the robot 102' having a default pose value, which may be a pose of the robot 102' at a home state, a most frequent pose of the robot 102' while executing one or more tasks, among others. In some forms, the dynamic pose state corresponds to any pose of the robot 102' while executing one or more tasks and not having the default pose value. The robot characteristics may be inputted by a user of the computing system 200 via the user interface 204. In another form, the robot characteristics may be predetermined and selected from a repository (e.g., a database).

When the sensor characteristics and/or the robot characteristics are defined, the sensor simulation module 220 is configured to generate a simulation of the operation of the image sensor(s) 106' and/or the robot 102'. During (or after) the simulation of the operation of the image sensor(s) 106' and/or the robot 102', the zone module 222 is configured to identify an undetectable zone within the voxelization 100'. As referred to herein, the phrase "undetectable zone" refers to a zone in which the image sensor(s) 106' are unable to obtain sensor data based on, for example, the sensor characteristics and/or presence of objects in the voxelization 100'. In addition to identifying an undetectable zone within the voxelization 100', the undetectable zone module 22 may identify other zones of the voxelization 100', such as a detectable zone and/or an out-of-sight zone. As referred to herein, the phrase "detectable zone" refers to a zone in which the image sensor(s) 106' (or image sensor(s) 106) are able to obtain image data of the voxelization 100' (or the workspace 100). As referred to herein, the phrase "out-of-sight zone" refers to a zone which is outside of the field of view of the image sensor(s) 106' (or image sensor(s) 106).

To identify the undetectable zones, the zone module 222 generates a depth map based on the simulated sensor operation and the plurality of voxels 101'. In one form, each depth value of the depth map is determined based on the field of view of the image sensor 106' and whether a given combination of pose scenarios of the robots 102' is within the field of view of the image sensor 106'. As an example, the zone module 222 initially determines the location of each voxel 101' in a world frame and determines, for each voxel 101', the depth map value based on a rotation and/or translation matrix of each image sensor 106' in the world frame and a pitch and/or yaw of the voxel 101' based on an origin of the image sensor 106' in the world frame. If the given combination of pose scenario of the robots 102' is within the field of view of the image sensors 106', the depth value in the corresponding region of the depth map may be less than a threshold value. If the given combination of pose scenario of the robots 102' is not within the field of view of the image sensors 106', the depth value in the corresponding region of the depth map may be greater than a threshold value. In some forms, the zone module 222 may designate the voxels 101' corresponding to lower depth values as undetectable zones and those having higher depth values as detectable zones.

In some forms, the zone module 222 repeats the above routine for each combination of pose scenarios of the robots 102' and determines an aggregate undetectable zone based on the undetectable zones associated with each combination of pose scenarios. In some forms, the zone module 222 determines an aggregate detectable zone based on the detectable zones associated with each combination of pose scenarios In some forms, the zone module 222 reduces the resolution of the depth map generated by the image sensors 106' to reduce the noise of the depth map and minimize latency of the computing system 200. Example resolution-reduction routines include, but are not limited to, a down-sampling routine.

In some forms, the MOC module 224 is configured to determine whether the aggregate undetectable zone satisfies one or more detection metrics. Example detection metrics include, but are not limited to: whether a size of the aggregate undetectable zone satisfies a size criteria (e.g., the aggregate undetectable zone is at a Pareto optimal state, an area or cross-sectional area of the aggregate undetectable zone is less than a threshold area, a volume of the aggregate undetectable zone is less than a threshold volume, a relative area and/or volume of the aggregate undetectable zone is less than a threshold area and/or volume, among others); a location criteria (e.g., whether the aggregate undetectable zone is located near a location in which a human may be positioned during operation of the corresponding robot 102, whether the aggregate undetectable zone is located near a location in which at least a portion of the automated tasks of the corresponding robot 102 occur, among others); and/or number of sensors (e.g., adding one or more sensors to areas that are undetectable and should be monitored, reducing number of sensors when the one or more image sensors 106 have overlapping field of view, among others).

To determine whether the aggregate undetectable zone satisfies one or more detection metrics, the MOC module 224 solves one or more multi-objective relations using a multi-objective optimization method, such as Pareto efficient global optimization (ParEGO), a non-dominated sorting genetic algorithm II (NSGA-II), a multi-objective evolutionary algorithm based on decomposition (MOEA-D), among others. In one form, the MOC module 224 determines whether the solved multi-objective relations are Pareto optimal solutions, as shown in the below example relations:

$$\text{maximize } f_1(x) = C(x, PCD_1), \quad (1)$$

$$\text{maximize } f_2(x) = \cup_{k=2,N} C^{(k)}(x, PCD_k), \quad (2)$$

$$\text{subject to } G_i = 1, i \in [1, N] \quad (3)$$

$$\text{subject to } x_i^{min} \leq x_i \leq x_i^{max}, i \in [1, M] \quad (4)$$

In the above relations, $f_1(x)$ represents one of the detectable zones corresponding to one combination of pose scenarios ($PCD_1$), $f_2(x)$ represents the aggregate detectable area represented as a worst-case aggregate function that evaluates a worst case value for K pose scenarios ($PCD_k$), C represents a ratio of the detectable zones and the undetectable zones, x represents a position and orientation of the image sensor 106', N represents an upper bound of the design variable, $G_i$ is a constraint related to a coverage ratio of a given voxel 101' (e.g., a voxel 101' that should always be in a detectable zone and have a value of 1), and M is a number of image sensors 106. It should be understood that the multi-objective relations may have other constraints in some forms. As such, the MOC module 224 determines the solved multi-objective relations are Pareto optimal solutions and is in a Pareto optimal state if the ratio of the detectable zones and the undetectable zones (C) is greater than a threshold value and the constraint related to a coverage ratio of a given voxel 101' (G) is satisfied (e.g., $G_i=1$).

In some forms, the sensor placement control module 226 is configured to modify a sensor configuration within the voxelization 100' based on a sensor placement routine. In one form, modifying the sensor configuration includes changing a number of the image sensor(s) 106', a placement of the image sensor(s) 106', a pose of the image sensors 106', or a combination thereof. In one form, the sensor placement routine includes iteratively modifying a sensor configuration of the image sensor(s) 106' until the aggregate undetectable area corresponds to the Pareto optimal state. In one form, the sensor placement control module 226 may be based on a genetic algorithm or incorporate a level of artificial intelligence (AI) to iteratively find an optimal layout.

Figure 4:
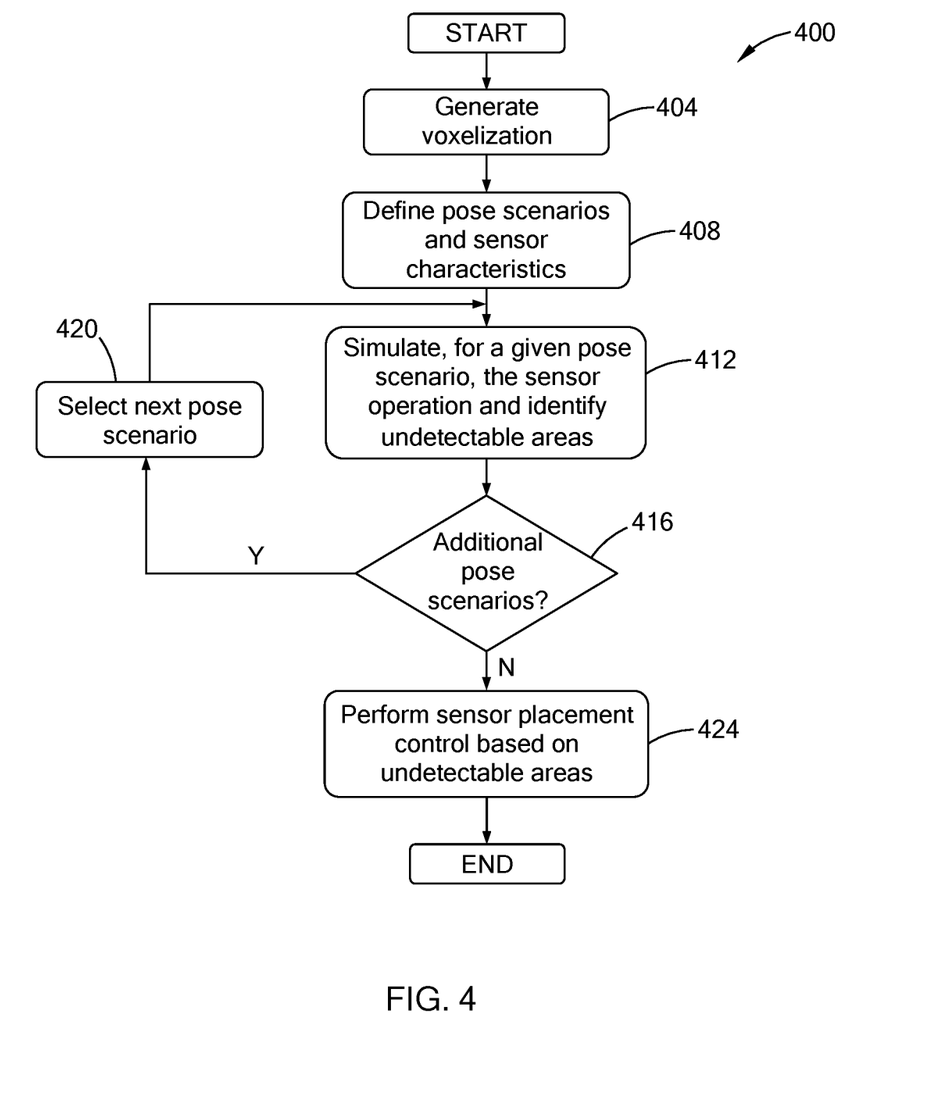
FIG. 4 illustrates an exemplary control routine in accordance with the teachings of the present disclosure.

Referring to FIG. 4, an example simulation routine 400 is provided, and the simulation routine 400 is performed by the computing system 200. At 404, the computing system 200 generates the voxelization 100' having one or more robots 102' and one or more image sensors 106'. At 408, the computing system 200 defines a plurality of pose scenarios of the one or more robots 102' and the sensor characteristics of the image sensors 106'. At 412, the computing system 200 simulates, for a given pose scenario, a sensor operation of the image sensors 106' based on the sensor characteristics and identifies an undetectable area within the voxelization 100' based on the simulated sensor operation. At 416, the computing system 200 determines whether the image sensors 106' need to be simulated for additional pose scenarios. If there are additional pose scenarios at 416, the routine 400 proceeds to 420, where the computing system 200 selects the next pose scenario and proceeds to 412. Otherwise, if the image sensors 106' have been simulated for each pose scenario, the routine 400 proceeds to 424, where the computing system 200 performs a sensor placement control routine based on the undetectable areas associated with each of the pose scenarios as described above, It should be readily understood that the simulation routine 400 is just an example routine performed by the computing system 200 and other routines may be implemented.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method comprising:
generating a workspace model having one or more robots and a plurality of image sensors, wherein the workspace model is a digital model of a workspace;
defining a plurality of pose scenarios of the one or more robots, wherein each pose scenario of the plurality of pose scenarios includes a pose of each of the one or more robots;
defining sensor characteristics of the plurality of image sensors, wherein the sensor characteristics includes an orientation of the image sensors, a location of the sensor within the workspace model, or a combination thereof;
for each of the plurality of pose scenarios:
simulating a sensor operation of the plurality of image sensors within the workspace model based on the sensor characteristics;
identifying an undetectable area and a detectable area from among a plurality of areas within the workspace model based on the simulated sensor operation; and
determining a plurality of coverage ratios associated with each of the undetectable areas;

determining an aggregate undetectable area and an aggregate detectable area based on the undetectable areas associated with each of the plurality of pose scenarios;

determining whether the aggregate undetectable area satisfies a detection metric, wherein determining whether the aggregate undetectable area satisfies the detection metric further comprises performing a multi-objective optimization routine to determine an aggregate ratio based on the aggregate detectable area and the aggregate undetectable area; and performing a sensor placement control when the aggregate undetectable area does not satisfy the detection metric, wherein the sensor placement control includes a determination of an optimal layout of the sensor placement based on an algorithmic iteration, and wherein the aggregate undetectable area does not satisfy the detection metric when the aggregate ratio is less than a threshold aggregate ratio and when a given coverage ratio from among the plurality of coverage ratios is less than a threshold coverage ratio.

2. The method of claim 1, wherein the sensor placement control further comprises modifying a sensor configuration within the workspace model in response to the aggregate undetectable area not satisfying the detection metric.

3. The method of claim 1 further comprising determining whether the aggregate ratio corresponds to a Pareto optimal state.

4. The method of claim 3, wherein the sensor placement control further comprises modifying a sensor configuration within the workspace model such that the aggregate ratio corresponds to the Pareto optimal state.

5. The method of claim 1, wherein the undetectable area within the workspace model is identified based on a plurality of voxels representing the workspace model.

6. The method of claim 5 further comprising generating a depth map based on the simulated sensor operation and the plurality of voxels, wherein the undetectable area within the workspace model is determined based on one or more values of the depth map.

7. The method of claim 6, wherein each of the one or more values of the depth map is associated with one of the plurality of voxels.

8. The method of claim 6, wherein the undetectable area within the workspace model is determined in response to the one or more values of the depth map being less than a threshold depth value.

9. The method of claim 8 further comprising reducing a resolution of the depth map.

10. The method of claim 1, wherein the plurality of pose scenarios include a default pose state and a dynamic pose state.

11. The method of claim 10, wherein the default pose state corresponds to the pose of each of the one or more robots having a default value.

12. The method of claim 10, wherein the dynamic pose state corresponds to the pose of at least one of the one or more robots not having a default value.

13. The method of claim 1, wherein the detection metric includes:
whether a size of the aggregate undetectable zone satisfies a size criteria, a location criteria, a number of sensors, or a combination thereof.

14. A system comprising:
a processor; and
a nontransitory computer-readable medium including instructions that are executable by the processor, wherein the instructions include:

generating a workspace model having a one or more robots and a plurality of image sensors, wherein the workspace model is a digital model of a workspace;

defining a plurality of pose scenarios of the one or more robots, wherein each pose scenario of the plurality of pose scenarios includes a pose of each of the one or more robots;

defining sensor characteristics of the plurality of image sensors, wherein the sensor characteristics includes an orientation of the image sensors, a location of the sensor within the workspace model, or a combination thereof;

for each of the plurality of pose scenarios:
simulating a sensor operation of the plurality of image sensors within the workspace model based on the sensor characteristics;

identifying an undetectable area and a detectable area from among a plurality of areas within the workspace model based on the simulated sensor operation; and determining a plurality of coverage ratios associated with each of the undetectable areas;

determining an aggregate undetectable area and an aggregate detectable area based on the undetectable areas associated with each of the plurality of pose scenarios;

determining whether the aggregate undetectable area satisfies a detection metric, wherein determining whether the aggregate undetectable area satisfies the detection metric further comprises performing a multi-objective optimization routine to determine an aggregate ratio based on the aggregate detectable area and the aggregate undetectable area; and performing a sensor placement control when the aggregate undetectable area does not satisfy the detection metric, wherein the sensor placement control includes a determination of an optimal layout of the sensor placement based on an algorithmic iteration, and wherein the aggregate undetectable area does not satisfy the detection metric when the aggregate ratio is less than a threshold aggregate ratio and when a given coverage ratio from among the plurality of coverage ratios is less than a threshold coverage ratio.

15. The system of claim 14, wherein the sensor placement control further includes modifying a sensor configuration within the workspace model in response to the aggregate undetectable area not satisfying the detection metric, wherein the detection metric includes: whether a size of the aggregate undetectable zone satisfies a size criteria, a location criteria, a number of sensors, or a combination thereof.

16. The system of claim 14, wherein the instructions further include determining whether the aggregate ratio corresponds to a Pareto optimal state.

17. The system of claim 16, wherein the sensor placement control further includes modifying a sensor configuration within the workspace model such that the aggregate ratio corresponds to the Pareto optimal state.

18. The system of claim 14, wherein the undetectable area within the workspace model is identified based on a plurality of voxels representing the workspace model.

19. A method comprising:
generating a workspace model having a one or more robots and a plurality of image sensors, wherein the workspace model is a digital model of a workspace;

defining a plurality of pose scenarios of the one or more robots, wherein each pose scenario of the plurality of pose scenarios includes a pose of each of the one or more robots;

defining sensor characteristics of the plurality of image sensors, wherein the sensor characteristics includes an orientation of the image sensors, a location of the sensor within the workspace model, or a combination thereof;

for each of the plurality of pose scenarios:

simulating a sensor operation of the plurality of image sensors within the workspace model based on the sensor characteristics;

identifying an undetectable area and a detectable area from among a plurality of areas within the workspace model based on the simulated sensor operation and a plurality of voxels representing the workspace model; and determining a plurality of coverage ratios associated with each of the undetectable areas;

determining an aggregate undetectable area and an aggregate detectable area based on the undetectable areas associated with each of the plurality of pose scenarios;

determining whether the aggregate undetectable area satisfies a detection metric, wherein determining whether the aggregate undetectable area satisfies the detection metric further comprises performing a multi-objective optimization routine to determine an aggregate ratio based on the aggregate detectable area and the aggregate undetectable area; and performing a sensor placement control when the aggregate undetectable area does not satisfy the detection metric, wherein the sensor placement control includes a determination of an optimal layout of the sensor placement based on an algorithmic iteration, and wherein the aggregate undetectable area does not satisfy the detection metric when the aggregate ratio is less than a threshold aggregate ratio and when a given coverage ratio from among the plurality of coverage ratios is less than a threshold coverage ratio.

20. The method of claim 19, wherein the detection metric includes:

whether a size of the aggregate undetectable zone satisfies a size criteria, a location criteria, a number of sensors, or a combination thereof.

* * * * *